United States Patent
Matthews et al.

(10) Patent No.: US 9,075,781 B2
(45) Date of Patent: Jul. 7, 2015

(54) SYSTEM AND METHOD FOR COORDINATING FIELD USER TESTING RESULTS FOR A MOBILE APPLICATION ACROSS VARIOUS MOBILE DEVICES

(71) Applicant: Apkudo, LLC, Baltimore, MD (US)

(72) Inventors: Joshua Scott Matthews, Baltimore, MD (US); David Michael Teitelbaum, Havre de Grace, MD (US)

(73) Assignee: Apkudo, LLC, Baltimore, MD (US)

( * ) Notice: Subject to any disclaimer, the term of this patent is extended or adjusted under 35 U.S.C. 154(b) by 96 days.

(21) Appl. No.: 13/837,851

(22) Filed: Mar. 15, 2013

(65) Prior Publication Data

US 2014/0281714 A1    Sep. 18, 2014

(51) Int. Cl.
 G06F 11/00    (2006.01)
 G06F 11/22    (2006.01)
(52) U.S. Cl.
 CPC .................................. *G06F 11/2294* (2013.01)
(58) Field of Classification Search
 USPC ...................................................... 714/27, 37
 See application file for complete search history.

(56) References Cited

U.S. PATENT DOCUMENTS

| | | | |
|---|---|---|---|
| 6,044,398 A | 3/2000 | Marullo et al. ................ 709/219 |
| 6,618,045 B1 | 9/2003 | Lin ............................... 345/207 |
| 6,745,385 B1 | 6/2004 | Lupu et al. .................... 717/163 |
| 7,343,390 B2 | 3/2008 | Cohen et al. .................. 709/203 |
| 7,388,977 B2 | 6/2008 | Wang et al. ................... 382/141 |
| 7,483,984 B1 | 1/2009 | Jonker et al. ................. 709/226 |
| 7,769,009 B1 | 8/2010 | Katzer et al. ................. 370/390 |
| 8,271,608 B2 | 9/2012 | Mahaffey et al. ............. 709/217 |
| 8,296,445 B1 | 10/2012 | Hackborn et al. ............ 709/228 |
| 8,971,821 B2 | 3/2015 | Schlub et al. ............. 455/67.12 |
| 2003/0145317 A1 | 7/2003 | Chamberlain ................ 717/177 |
| 2004/0261248 A1 | 12/2004 | Hwang .......................... 29/559 |

(Continued)

FOREIGN PATENT DOCUMENTS

| | | |
|---|---|---|
| CN | 102110053 A | 6/2011 |
| CN | 102141960 A | 8/2011 |

(Continued)

OTHER PUBLICATIONS

"Monkeyrunner", A Simple monkeyrunner Program, the monkeyrunner API, Running monkeyrunner, monkeyrunner Built-in Help, and Extending monkeyrunner with Plugins, [no date], 6 pages.

(Continued)

*Primary Examiner* — Sarai Butler
(74) *Attorney, Agent, or Firm* — Pillsbury Winthrop Shaw Pittman LLP

(57) ABSTRACT

A system and method for coordinating field user testing results for a mobile application across various mobile devices is provided. The system may comprise a plurality of mobile devices configured to facilitate field user testing of a test application, and a computing device configured to provide analysis related to field user testing of the test application. A testing module of the mobile device may be configured to: perform one or more operations of the test application; collect a plurality of metrics related to an execution of the one or more operations of the test application; determine whether an error occurred with an operation of the test application based on the collected one or more metrics; and transmit, to one or more other mobile devices, one or more metrics related to the execution of the operation at which the error occurred. The testing module may be part of the operating system.

35 Claims, 7 Drawing Sheets

(56) References Cited

U.S. PATENT DOCUMENTS

| | | | |
|---|---|---|---|
| 2006/0038581 A1 | 2/2006 | Kanai | 324/770 |
| 2006/0139269 A1 | 6/2006 | Takeshita et al. | 345/87 |
| 2006/0174162 A1 | 8/2006 | Varadarajan et al. | 714/38 |
| 2007/0186250 A1 | 8/2007 | Carey | 725/62 |
| 2007/0205751 A1 | 9/2007 | Suzuki et al. | 324/158.1 |
| 2007/0256114 A1 | 11/2007 | Johnson et al. | 725/139 |
| 2008/0013825 A1 | 1/2008 | Nagatsuka et al. | 382/153 |
| 2008/0274716 A1 | 11/2008 | Fok et al. | 455/410 |
| 2008/0316217 A1 | 12/2008 | Khan | 345/522 |
| 2008/0316368 A1 | 12/2008 | Fritsch et al. | 348/722 |
| 2009/0007074 A1 | 1/2009 | Campion et al. | 717/124 |
| 2009/0031015 A1 | 1/2009 | Morgan et al. | 709/223 |
| 2009/0124250 A1 | 5/2009 | Topaltzas et al. | 455/423 |
| 2009/0138579 A1 | 5/2009 | Jung | 709/221 |
| 2009/0203368 A1 | 8/2009 | Marsyla et al. | 455/418 |
| 2009/0249301 A1 | 10/2009 | Kalla et al. | 717/127 |
| 2009/0265035 A1 | 10/2009 | Jenkinson et al. | 700/259 |
| 2009/0307531 A1 | 12/2009 | Karthikeyan et al. | 714/38 |
| 2009/0312009 A1 | 12/2009 | Fishel | 455/425 |
| 2010/0080143 A1 | 4/2010 | Topaltzas et al. | 370/253 |
| 2010/0088423 A1 | 4/2010 | Mazzagatte et al. | 709/229 |
| 2010/0198402 A1 | 8/2010 | Greer et al. | 700/247 |
| 2010/0231738 A1 | 9/2010 | Border et al. | 348/222.1 |
| 2011/0080940 A1 | 4/2011 | Bocharov et al. | 375/240.01 |
| 2011/0087924 A1* | 4/2011 | Kandula et al. | 714/26 |
| 2011/0113287 A1* | 5/2011 | Gururaj | 714/37 |
| 2011/0263243 A1 | 10/2011 | Topaltzas et al. | 455/423 |
| 2011/0288964 A1 | 11/2011 | Linder et al. | 705/27.1 |
| 2011/0296009 A1 | 12/2011 | Baranov et al. | 709/224 |
| 2011/0302454 A1 | 12/2011 | Prophete et al. | 714/38.1 |
| 2011/0304634 A1 | 12/2011 | Urbach | 345/501 |
| 2011/0310041 A1 | 12/2011 | Williams et al. | 345/173 |
| 2011/0320879 A1 | 12/2011 | Singh et al. | 714/38.1 |
| 2012/0015723 A1 | 1/2012 | Lai | 463/31 |
| 2012/0070090 A1 | 3/2012 | Chang et al. | 382/218 |
| 2012/0146956 A1 | 6/2012 | Jenkinson | 345/178 |
| 2012/0155292 A1 | 6/2012 | Zazula et al. | 370/252 |
| 2012/0188176 A1 | 7/2012 | Uzelac et al. | 345/173 |
| 2012/0191394 A1 | 7/2012 | Uzelac et al. | 702/79 |
| 2012/0198279 A1 | 8/2012 | Schroeder | 714/32 |
| 2012/0210242 A1 | 8/2012 | Burckart et al. | 715/744 |
| 2012/0221570 A1 | 8/2012 | Kalavade | 707/736 |
| 2012/0221893 A1 | 8/2012 | Bai et al. | 714/27 |
| 2012/0231785 A1 | 9/2012 | Poon et al. | 455/423 |
| 2012/0245918 A1 | 9/2012 | Overton et al. | 703/27 |
| 2012/0246515 A1 | 9/2012 | Lusenhop et al. | 714/32 |
| 2012/0254917 A1 | 10/2012 | Burkitt et al. | 725/40 |
| 2012/0266142 A1* | 10/2012 | Bokhari | 717/127 |
| 2012/0280934 A1 | 11/2012 | Ha et al. | 345/174 |
| 2012/0311569 A1 | 12/2012 | Shah | 718/1 |
| 2013/0002862 A1 | 1/2013 | Waring et al. | 348/143 |
| 2013/0132616 A1 | 5/2013 | Worthington et al. | 710/18 |
| 2013/0197862 A1 | 8/2013 | Uzelac et al. | 702/186 |
| 2013/0200917 A1 | 8/2013 | Panagas | 324/757.01 |
| 2014/0152584 A1 | 6/2014 | Matthews et al. | 345/173 |
| 2014/0156783 A1 | 6/2014 | Matthews et al. | 709/217 |

FOREIGN PATENT DOCUMENTS

| | | |
|---|---|---|
| EP | 2 369 481 | 9/2011 |
| EP | 2 492 814 | 8/2012 |
| EP | 2 515 526 | 10/2012 |
| JP | 2008-244688 | 10/2008 |
| WO | WO 2011/128514 | 10/2011 |
| WO | WO 2014/150306 | 9/2014 |

OTHER PUBLICATIONS

"Testdroid Recorder 2.0.9", Testing, Tools, Application Development Frameworks, and Mobile and Device Development, [no date], 3 pages.

"Metrico Wireless", printed from http://www.metricowireless.com, copyright 2003-2012, printed Nov. 7, 2012, 6 pages.

"Crittercism", printed from http://www.crittercism.com, printed Nov. 7, 2012, 9 pages.

"OpenSignal—Crowdsourced Coverage Maps—About Us", printed from http://opensignal.com/about.php, copyright 2012, printed Nov. 7, 2012, 1 page.

"Savage Minds", printed from http://www.savageminds.com. copyright 2011, printed Nov. 7, 2012, 19 pages.

Optofidelity Touch Panel Performance Test systems Brochure, dated Aug. 2013 available at http://www.optofidelity.com/wp-content/uploads/2013/09/OF_TPPT_general.pdf, 4 pages.

Optofidelity Test Automation Product Portfolio Brochure, dated May 2014 available at http://www.optofidelity.com/wp-content/uploads/2014/07/OF_ProductPortfolio_2014_En.pdf, 6 pages.

Video of Optofidelity Touch Panel Performance Tester, dated Oct. 15, 2012 available at https://www.youtube.com/watch?v=g_sxn1hZu76, 1 page.

Optofidelity Watchdog Brochure, dated Oct. 2013 available at http://www.optofidelity.com/wp-content/uploads/2013/11/OF_WatchDog_EN_www.pdf, 2 pages.

Optofidelity Measurement Services Brochure, dated Q1 2013 available at http://www.optofidelity.com/wp-content/uploads/2013/09/OF_MeasurementReport.pdf, 10 pages.

* cited by examiner

SYSTEM AND METHOD FOR COORDINATING FIELD USER TESTING RESULTS FOR A MOBILE APPLICATION ACROSS VARIOUS MOBILE DEVICES

FIELD OF THE INVENTION

The invention relates to a system and method for coordinating field user testing results for a mobile application across various mobile devices.

BACKGROUND OF THE INVENTION

Field user testing of mobile applications involves testing applications running on mobile devices in their respective working environments. For example, an application developer may select a group of users to test an application on various mobile devices with different hardware, and one or more versions of one or more operating systems. The users may report errors that they encounter during testing to the application developer.

Some conventional systems may employ semi-automated field user testing. For example, some conventional field user testing systems may facilitate the communication of an error that occurs during testing to a server in communication with the mobile device. Other conventional systems may communicate an error that occurred during testing to other mobile devices via instant messaging capabilities.

Conventional systems, whether employing user reporting or some type of automated reporting of errors, typically experience a lag between the occurrence of an error and analysis of that error. That lag may affect reproducibility of the error and the ability to determine how the error occurred.

Conventional systems for field user testing of mobile applications suffer from these and other drawbacks.

SUMMARY OF THE INVENTION

The invention solving these and other drawbacks of conventional systems relates to a system and method for coordinating field user testing results for a mobile application across various mobile devices.

According to an aspect of the invention, an application developer may wish to field test an application (a "test application") using a selection of mobile devices. The selection of mobile devices may comprise mobile devices having differing attributes such as, for example, different hardware, one or more operating systems, one or more versions of one or more operating systems, and/or other differing attributes.

The application developer may select a pre-determined number of mobile devices to which to deploy the test application. For example, the application developer may choose one or more sets of mobile devices, where the mobile devices in a given set differ by a single attribute. An attribute, for example, may comprise a hardware component, a software component, an operating system, a version of an operating system, and/or other attribute. In another example, the application developer may select a pre-determined number of mobile devices, where the devices may differ by more than one attribute.

A mobile device may test a test application by performing one or more operations by the test application. In one implementation, an application developer may prepare one or more test scripts for testing a test application. A test script may comprise a plurality of operations, an order in which the operations are to be performed, input data for one or more of the plurality of operations, and/or other information for testing a test application. The mobile devices on which the test application is deployed may use the one or more test scripts for testing the application. In one implementation, one or more users of the mobile devices may perform one or more operations by the test application, where the one or more operations may not be associated with a test script.

The mobile devices on which a test application is deployed may communicate with one another and with a computing device that may provide analysis related to the testing. For example, the mobile devices and the computing device may communicate with one another to track, replicate, and/or otherwise analyze an error that occurs during testing of the test application. The mobile devices and/or the computing device may determine characteristics associated with devices that encountered the error. The mobile devices may communicate by broadcasting data over a network (e.g., an Intranet), by transmitting data to a multicast socket at the computing device (which may be broadcast to all mobile devices able to connect to the multicast socket), by transmitting data to the computing device whereby the computing device transmits the data to the mobile devices, by transmitting data to each device included in a list of devices stored at the respective mobile devices, by requesting a list of mobile devices to which to transmit data from the computing device and transmitting data to each device including in that list, or in other manners.

According to an aspect of the invention, each mobile device in a selection of mobile devices may receive the test application. The test application may be stored on the mobile device before the mobile device is made available to a user to test the application, may be received via the computing device (e.g., via a download), may be received via the Internet, an intranet, and/or other network, may be received via an application store accessible via the mobile device, may be received via another application accessible via the mobile device, may be uploaded from an electronic storage media, may be received from one or more devices at a cloud computing environment that hosts the computing device, and/or may be obtained in other ways. In an implementation in which test scripts are used during testing of the test application, one or more test scripts associated with the test application may be stored at the mobile device, accessed from the computing device (e.g., via a download), accessed from another device via a network, uploaded from another device, obtained in a same or similar manner as the test application, and/or obtained in other ways.

In one implementation, the computing device configured to provide analysis regarding the test application may reside in a cloud computing environment. The computing device may be hosted and/or monitored by the application developer, by a third party service provider, and/or by another entity.

In one implementation, a third party service provider (or other entity) may facilitate field user testing of a test application. For example, the third party service provider may select mobile devices on which the test application is to be deployed, prepare one or more test scripts for testing the test application, facilitate the deployment of the test application to a selection of mobile devices, and/or otherwise facilitate field user testing of the test application. The third party service provider may facilitate access, for the application developer, to data and analysis related to the test application. In one implementation, the third party service provider may facilitate field user testing for one or more test applications for one or more application developers.

According to an aspect of the invention, a system for coordinating field user testing results for a mobile application across various mobile devices may comprise a plurality of mobile devices configured to facilitate field user testing of a test application, and a computing device configured to provide analysis related to field user testing of the test application.

Mobile Device

A mobile device may include a non-transitory electronic storage media that stores an operating system, one or more physical processors configured to execute computer modules, and/or other components. The non-transitory electronic storage media may be configured to store a test application, metrics related to the test application, and/or other information related to the test application and/or the mobile device. The computer modules of the mobile device may comprise a network module configured to facilitate communication with other mobile devices and the computing device, a testing module configured to enable field user testing of the test application, and/or other modules.

The testing module (of the mobile device) may be configured as part of the operating system of the mobile device. For example, the testing module may comprise a data collection utility built into the framework of the operating system. In one non-limiting implementation, the mobile device may comprise an Android operating system. In this implementation, the testing module may be initiated and/or managed by the system_server process of the Android operating system. A binder process of the Android operating system may connect applications of the mobile device to the system_server process and the testing module via an Application Program Interface ("API"). The testing module may have same or similar privileges and access' as the operating system to the test application and to data related to execution of the test application. The testing module may itself comprise various modules including, for example, a metric collection module, an error handling module, an error replication module, and/or other modules.

The metric collection module may be configured to collect and store, at the non-transitory electronic storage media, metrics from the execution of a test application and metrics from the operation of the mobile device. For example, for each operation of the test application performed, the metric collection module may collect and/or store information related to one or more prior operations performed, a state of the test application, a state of the mobile device, one or more parameters associated with the operation, one or more inputs to the operation, one or more outputs from the operation, a result of the operation, an associated test script, and/or other information related to the operation. The operations performed by the test application may correspond to one or more operations in one more test scripts related to the test application. For example, the test scripts may be performed by a user of the mobile device, may be automatically executed by the mobile device, may be automatically executed by the testing module, and/or may be performed in other ways. In one implementation, one or more of operations performed may be random operations that do not correspond to a test script.

The metric collection module may collect and store, at the non-transitory electronic storage media, information related to operation of the mobile device. For example, the metric collection module may collect and store information related to when any application (including, for example, the test application) crashes on the mobile device, when the mobile device is unable to perform any operation related to any application, whether a reset of the operating system occurred, device temperature, battery usage, cellular data usage, Wi-Fi data usage, network state, whether any phone calls were dropped, information related to logs stored via operation of the mobile device, and/or other information related to operation of the mobile device.

The metric collection module may transmit information related to execution of the test application and operation of the mobile device to the computing device. For example, the metric collection module may transmit information at predetermined intervals, based on a request by the computing device, based on a request by a user of the mobile device, and/or in response to other information.

The error handling module of the testing module may be configured to detect errors that occur in the test application, transmit information relating to detected errors to other mobile devices, receive information relating to replication attempts from other mobile devices, determine whether an error occurred at one or more other mobile devices, determine characteristics relating to detected errors based on replication information from other mobile devices, and/or perform other functionality related to error handling.

When an operation is associated with a test script, the non-transitory electronic storage media may store information relating to expected results based on execution of the operation. The error handling module may compare information collected by the metric collection module relating to an operation and information stored at the non-transitory electronic storage media relating to the operation. In response to a determination that information collected by the metric collection module does not match information relating to expected results, the error handling module may indicate that an error occurred with the operation.

The non-transitory electronic storage media may store information related to one or more events that indicate that an error occurred. The information related to the one or more events may indicate that an error occurred with an operation of the test application, with operation of the mobile device, and/or that another type of error occurred. The error handling module may compare information collected by the metric collection module relating to the operation and information stored at the non-transitory electronic storage media relating to the one or more events. In response to a determination that information collected by the metric collection module matches information relating to one or more events, the error handling module may indicate that an error occurred with the operation.

In response to an indication by the error handling module that an error occurred, the error handling module may augment stored information relating to the operation with an indication that an error occurred with the operation. In one implementation, the non-transitory electronic storage media may store information related to the error separately from information collected by the metric collection module. For example, the non-transitory electronic storage media may store error information related to the error in an error log. The error information may include, for example, one or more of an identification of the test application, an identification of the operation at which the error occurred, one or more parameters associated with the operation at which the error occurred, input data for the operation at which the error occurred, output data for the operation at which the error occurred, one or more results of the operation at which the error occurred, information related to one or more operations that occurred before the operation at which the error occurred, one or more parameters for each of the one or more operations, input data for each of the one or more operations, output data for each of the one or more operations, a state of the test application when the error occurred, an associated test script, and/or other information related to the error. In one implementation, the error handling module may transmit error information related to the error to the computing device in response to a determination that the error occurred, at pre-determined intervals during execution of the test application, and/or in response to other information.

In one implementation, a format for error information may comprise, for example, a first portion related to a magic number, a second portion related to a timestamp, a third portion related to a type of data, a fourth portion related to length of the record, a fifth portion related to context specific data, and/or other portions that describe a format for the record. For example, a timestamp may comprise a number of milliseconds represented as a 48 bit unsigned integer. A type of data may be a 16-bit unsigned integer, a 16 bit signed integer, a string, and/or other type of data. A length of the record may be represented as a 16-bit unsigned integer. Context-specific data may comprise, for example, logcat, kmsg, and/or other context-specific data.

In response to a determination that an error occurred with an operation, the error handling module may transmit error information relating to the error to other mobile devices. The error handling module may transmit error information relating to the error to mobile devices included in a list stored in the non-transitory electronic storage media. In one implementation, the error handling module may request, from the computing device, a list of mobile devices to which to transmit error information. In one implementation, the error handling module may broadcast the error information over a network (e.g., an intranet) such that all other devices connected to the network may receive the error information. In one implementation, the error handling module may transmit data to a multicast socket at the computing device via which the data may be broadcast to all mobile devices able to connect to the multicast socket.

In response to transmission of the error information to other mobile devices, the error handling module may receive replication information from one or more other mobile devices regarding the error information. In one implementation, the computing device may receive replication information from one or more other mobile devices. The replication information may comprise information related to results of an attempt to replicate the error by other mobile devices. The replication information may include information relating to the mobile device from which the replication information was received. For example, the replication information may include information relating to attributes of the mobile device from which the replication information was received, such as, for example, hardware of the mobile device, operating system, operating system version, and/or other attributes. The error handling module may determine whether another mobile device was able to replicate the error based on a comparison of the replication information received from the other mobile device and the error information relating to the operation at which the error occurred.

In response to a determination of which mobile devices were able to replicate the error, the error handling module may determine characteristics relating to the error. For example, the error handling module may determine that the error may occur at mobile devices that share one or more attributes such as, for example, a hardware component, an operating system, a version of an operating system, and/or other attributes.

The error replication module of the testing module may be configured to receive error information to replicate an error that occurred at another mobile device, store results related to an error replication attempt, send the results to the another mobile device and/or to the computing device, and/or perform other functionality related to error replication.

The error replication module may receive error information from another mobile device. The error information may comprise, for example, an identifier relating to a test application, an operation during which the error occurred, information relating to one or more operations to be executed to reproduce the error, state information relating to the test application when the error occurred, state information relating to the mobile device when the error occurred, data inputs to the operation and to any operations that preceded the operation at which the error occurred, a test script comprising the operations executed (and corresponding data inputs) to reproduce the error, and/or other information related to the error and/or its reproduction.

In response to a determination that the error information includes information related to a test script, the error replication module may attempt to automatically replicate the error by executing the relevant operations set forth in the test script.

In one implementation, the error information may comprise a link to the test application. In response to receipt of user input that accesses the link to the test application, the error replication module may open the test application. The error replication module may automatically execute the operations of the test application using data inputs received in the error information to attempt to reproduce the error. In one implementation, the error replication module may open the test application and may display instructions regarding how to replicate the error. The error replication module may receive user input to execute the operations to reproduce the error.

In response to the execution of an operation by the error replication module (or a mobile device), the metric collection module of the mobile device may collect information relating to the operation. Responsive to the error replication module executing the operation at which the error occurred, the error replication module may communicate the information collected by the metric collection module for the operation to the mobile device from which it received the error information.

A mobile device may act as a sending device when an error occurs during testing of the test application at the mobile device. A mobile device may also act as a receiving device when receiving information related to an error that occurred during testing of the test application at another mobile device. In response to a determination that an error occurred at a sending device, one or more mobile devices may act as respective one or more receiving devices. A receiving device may perform the functionality of the error replication module of the testing module. Both a sending device and a receiving device may perform some or all of the functionality of the error handling module of the testing module.

Computing Device

According to an aspect of the invention, a computing device may comprise a non-transitory electronic storage media configured to store information related to field user testing of one or more test applications, one or more physical processors configured to execute one or more computer modules, and/or other components. The one or more computer modules of the computing device may comprise, for example, a network module configured to facilitate communication with a network and with a plurality of mobile devices, an error analysis module configured to provide analysis related to a test application, a reporting module configured to facilitate analysis and report information related to information stored at the non-transitory electronic storage media, and/or other modules.

The non-transitory electronic storage media (of the computing device) may be configured to store one or more test applications, information related to the one or more mobile devices, information related to one or more operations performed by the test application at one or more mobile devices, error information received from one or more mobile devices, replication information received from one or more mobile devices, data related to analysis of the one or more test applications, and/or other information related to field user testing of the one or more test applications. In one implementation, the non-transitory electronic storage media may comprise an error log configured to store information relating to one or more errors that occurred during testing of a test application. In one implementation, the non-transitory electronic storage media may store a list of mobile devices to which the test application is deployed. The list may include attributes related to one or more of the mobile devices.

For each test application, the non-transitory electronic storage media may store information relating to expected results based on execution of operations of the test application. The non-transitory electronic storage media may store information related to one or more events that indicate that an error occurred. The information related to the one or more events may indicate that an error occurred with an operation of the test application, with operation of the mobile device, and/or that another type of error occurred.

The error analysis module may be configured to receive, from a sending device, information related to one or more operations performed by the test application at the sending device. For example, the error analysis module may be configured to receive the information from the sending device at pre-determined intervals, in response to a request for the information transmitted from the computing device to the sending device, and/or in response to other information. In one implementation, the error analysis module may be configured to transmit the received information to one or more receiving devices.

The error analysis module may compare received information relating to an operation and information stored at the non-transitory electronic storage media relating to the operation. In response to a determination that received information does not match stored information relating to expected results, the error analysis module may indicate that an error occurred with the operation.

The error analysis module may compare received information and information stored at the non-transitory electronic storage media relating to the one or more events. In response to a determination that received information matches information relating to one or more events, the error analysis module may indicate that an error occurred with the operation.

The error analysis module may be configured to also receive error information related to an error that occurred with an operation of the test application.

The error analysis module may store, at an error log of the non-transitory electronic storage media, received information relating to an operation at which an error occurred, received error information, and/or other information relating to an error that occurred at the sending device. The computing device may facilitate access, for an application developer associated with a test application, to information at the error log associated with the test application.

In one implementation, the error analysis module may receive replication information from one or more receiving devices. The replication information may comprise information related to results of an attempt to replicate the error by the one or more receiving devices. The replication information may include information relating to the receiving device from which the replication information was received. For example, the replication information may include information relating to attributes of the receiving device from which the replication information was received, such as, for example, hardware of the mobile device, operating system, operating system version, and/or other attributes. In one implementation, a list of receiving devices accessible by the error analysis module may include information relating to attributes of the respective receiving devices. The error analysis module may determine whether a receiving device was able to replicate the error based on a comparison of the replication information received from the receiving device and corresponding error information.

In one implementation, the error analysis module may compare replication information received from one or more receiving devices to which the error information was transmitted. Based on which receiving devices were able to replicate the error, the error analysis module may determine attributes of the mobile devices associated with the error. For example, the error analysis module may determine that the error may occur at mobile devices that share one or more attributes such as, for example, a specific piece of hardware, a type of operating system, a version of an operating system, and/or other attributes. The error analysis module may store, at the error log, information relating to characteristics relating to the error. In one implementation, the error analysis module may augment information stored at the error log relating to the error with information relating to attributes associated with devices that produce the error.

The reporting module may be configured to facilitate analysis and report information related to information stored at the non-transitory electronic storage media. For example, the reporting module may be configured to provide, for a test application, one or more reports related to errors that occurred during testing of the test application, one or more reports comprising information from the error log of the non-transitory electronic storage media of the computing device, one or more reports related to error information from a sending device and replication information from one or more receiving devices, and/or other information related to field user testing of the test application. In one implementation, the reporting module may be configured to prepare and/or display reports including statistics regarding field user testing of one or more test applications. The types of reports prepared by reporting module are not limited to the examples described herein.

In one implementation, reporting module may facilitate a search for information related to field user testing of one or more test applications. For example, the reporting module may facilitate a search for errors that occurred at mobile devices with a set of specific attributes. In another example, the reporting module may facilitate a search for errors that were replicated in other mobile devices. The types of searches facilitated by the reporting module are not limited to the examples described herein.

The reporting module may generate reports relating to field user testing of one or more test applications at pre-determined time intervals, in response to a request by an application developer, in response to a request by a user of a mobile device, upon completion of field user testing for a test application, and/or at other times.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
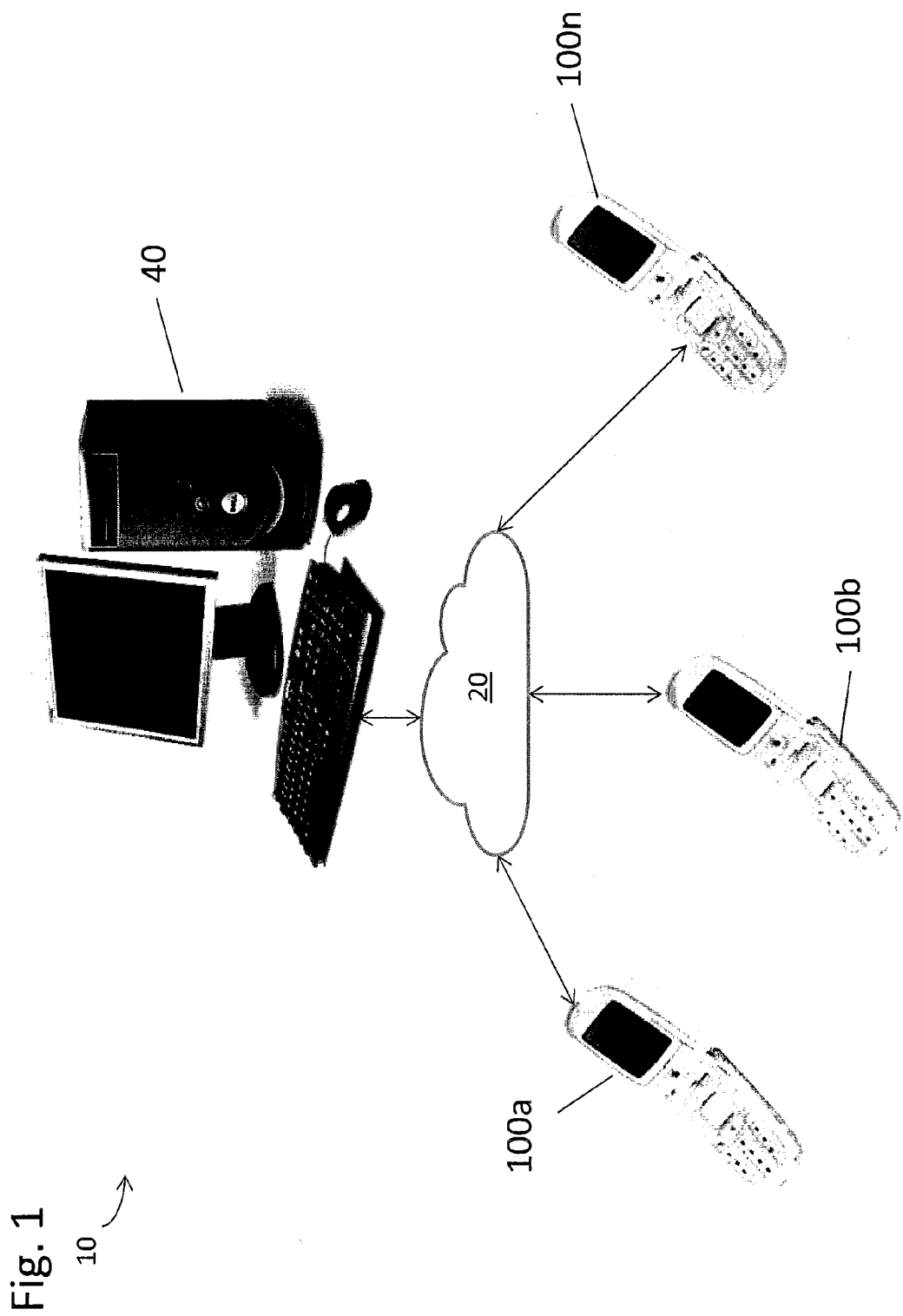
FIG. 1 illustrates an exemplary diagram of a system for coordinating field user testing results for a mobile application across various mobile devices, according to an aspect of the invention.

FIG. 1 illustrates an exemplary diagram of a system 10 for coordinating field user testing results for a mobile application across various mobile devices. According to an aspect of the invention, system 10 may comprise a plurality of mobile devices 100a, 100b, ... 100n configured to facilitate field user testing of a test application, and a computing device 40 configured to provide analysis related to field user testing of the test application. According to an aspect of the invention, an application developer may wish to field test an application (a "test application") using a selection of mobile devices 100a, 100b, ... 100n. Mobile devices 100a, 100b, ... 100n may have differing attributes such as, for example, different hardware, one or more operating systems, one or more versions of one or more operating systems, and/or other differing attributes.

Mobile devices 100a, 100b, ... 100n (on which a test application is deployed) may communicate with one another and with computing device 40. Computing device 40 may provide analysis related to the testing. For example, mobile devices 100a, 100b, ... 100n and computing device 40 may communicate with one another to track, replicate, and/or otherwise analyze an error that occurs during testing of the test application. Mobile devices 100a, 100b, ... 100n and/or computing device 40 may determine characteristics associated with mobile devices 100a, 100b, ... 100n that encountered the error. Mobile devices 100a, 100b, ... 100n may communicate by broadcasting data over a network 20, by transmitting data to a multicast socket at computing device 40 (which may be broadcast to all mobile devices 100a, 100b, ... 100n able to connect to the multicast socket), by transmitting data to computing device 40 whereby computing device 40 transmits the data to the mobile devices 100a, 100b, ... 100n, by transmitting data to each device included in a list of devices stored at respective mobile devices 100a, 100b, ... 100n, by requesting a list of mobile devices to which to transmit data from computing device 40 and transmitting data to each device including in that list, or in other manners.

According to an aspect of the invention, each mobile device in a selection of mobile devices 100a, 100b, ... 100n may receive the test application. For example, the test application may be stored on mobile device 100a before mobile device 100a is made available to a user to test the application, may be received via computing device 40 (e.g., via a download), may be received via network 20, may be received via an application store accessible via mobile device 100a, may be received via another application accessible via mobile device 100a, may be uploaded from an electronic storage media, may be received from one or more devices at a cloud computing environment that hosts computing device 40, and/or may be obtained in other ways. In an implementation in which test scripts are used during testing of the test application, one or more test scripts associated with the test application may be stored at mobile device 100a, accessed from computing device 40 (e.g., via a download), accessed from another device via a network, uploaded from another device, obtained in a same or similar manner as the test application, and/or obtained in other ways.

In one implementation, computing device 40 configured to provide analysis regarding the test application may reside in a cloud computing environment. Computing device 40 may be hosted and/or monitored by an application developer, by a third party service provider, and/or by another entity.

Figure 2:
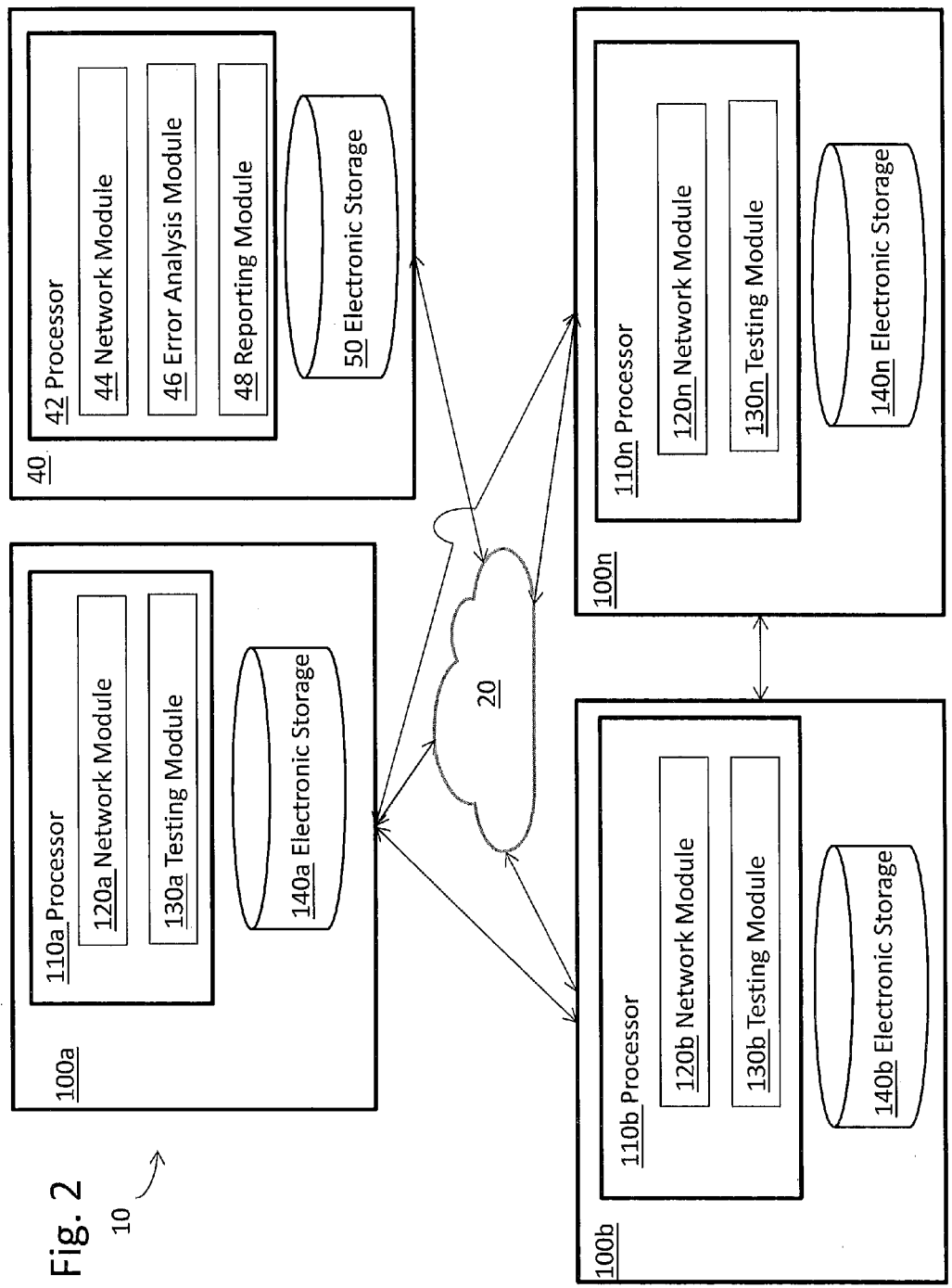
FIG. 2 illustrates an exemplary diagram of a system for coordinating field user testing results for a mobile application across various mobile devices, according to an aspect of the invention.

FIG. 2 illustrates an exemplary diagram of system 10, comprising plurality of mobile devices 100a, 100b, ... 100n configured to facilitate field user testing of a test application, and computing device 40 configured to provide analysis related to field user testing of the test application.

Mobile Device

Mobile device 100a may include a non-transitory electronic storage media 140a that stores an operating system, one or more physical processors 110a configured to execute computer modules, and/or other components. Non-transitory electronic storage media 140a may be configured to store a test application, metrics related to the test application, and/or other information related to the test application, and/or mobile device 100a. The computer modules of mobile device 100a may comprise a network module 120a configured to facilitate communication with other mobile devices and computing device 40, a testing module 130a configured to enable field user testing of the test application, and/or other modules.

Mobile device 100a may be any mobile device such as, for example, a personal digital assistant, smart phone, tablet, and/or other mobile device. Mobile device 100a may be capable of communicating with one or more mobile devices (e.g., mobile device 100b, ..., 100n) and one or more computing devices (e.g., computing device 40) over network 20. Network 20 may be, for example, a public or private network, or any other suitable communication channel. Mobile device 100a may also include other components typically found in mobile devices, including, for example, user input features (e.g., a touch screen, microphone, keyboard, and/or other user input features), speakers, an antenna (and the corresponding signal processing capabilities), and/or other features. Other mobile devices (e.g., mobile device 100b, ..., 100n) may include similar features.

Processor 110a may provide information processing capabilities within mobile device 100a. As such, processor 110a may include one or more of a digital processor, an analog processor, a digital circuit designed to process information, an analog circuit designed to process information, a state machine, and/or other mechanisms for electronically processing information. Although processor 110a is shown in FIG. 2 as a single entity, this is not intended to be limiting, as processor 110a may include a plurality of processors operating in coordination or cooperation. Processor 110a may be configured to execute modules 120a and/or 130a. Processor 110a may be configured to execute modules 120a and/or 130a by software, hardware, firmware, some combination of software, hardware, and/or firmware, and/or other mechanisms for configuring processing capabilities on processor 110a.

It should be appreciated that although modules 120a and 130a are illustrated in FIG. 2 as being co-located within a single computing device, in implementations in which processor 110a includes multiple processing units, one or more of modules 120a and/or 130a may be located remotely from the other modules. The description of the functionality provided by different modules 120a and/or 130a described below is for illustrative purposes, and is not intended to be limiting, as any of modules 120a and/or 130a may provide more or less functionality than is described. For example, one or more of modules 120a and/or 130a may be eliminated, and some or all of its functionality may be provided by other ones of modules 120a and/or 130a. As another example, processor 110a may be configured to execute one or more additional modules that may perform some or all of the functionality attributed below to one of modules 120a and/or 130a.

Non-transitory electronic storage media 140a may comprise electronic storage media that electronically stores information non-transiently. Electronic storage media of non-transitory electronic storage media 140a may include one or both of system storage that is provided integrally (i.e., substantially non-removable) with mobile device 100a and/or removable storage that is removably connectable to mobile device 100a via, for example, a port (e.g., a USB port, a firewire port, etc.) or a drive (e.g., a disk drive, etc.). Non-transitory electronic storage media 140a may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.); solid-state storage media (e.g., flash drive, etc.), and/or other electronically readable storage media. Non-transitory electronic storage media 140a may include one or more virtual storage resources (e.g., cloud storage, a virtual private network, and/or other virtual storage resources). Non-transitory electronic storage media 140a may store software algorithms, information determined by processor 110a, information received from other mobile devices 100b, ..., 100n, information received from computing device 40, and/or other information that enables mobile device 100a to function as described herein.

Figure 3:
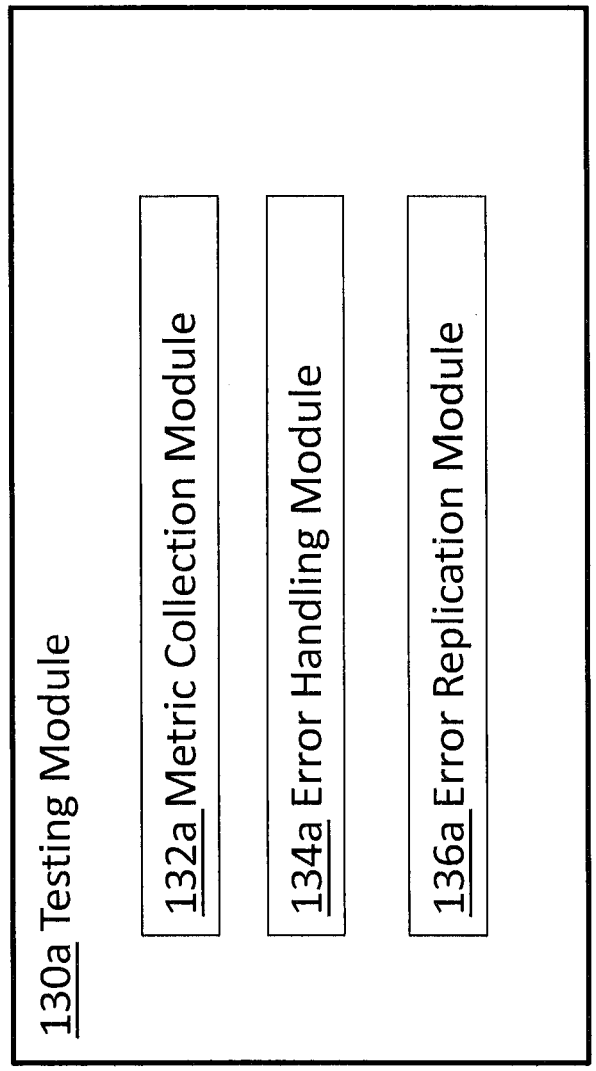
FIG. 3 illustrates an exemplary diagram of a testing module, according to an aspect of the invention.

In one implementation, testing module 130a (of mobile device 100a) may be configured as part of the operating system of mobile device 100a. For example, testing module 130a may comprise a data collection utility built into the framework of the operating system. In one non-limiting implementation, mobile device 100a may comprise an Android operating system. In this implementation, testing module 130a may be initiated and/or managed by the system_server process of the Android operating system. A binder process of the Android operating system may connect applications of the mobile device to the system_server process and testing module 130a via an Application Program Interface ("API"). Testing module 130a may have same or similar privileges and access as the operating system to the test application and to data related to execution of the test application. As shown in FIG. 3, testing module 130a may itself comprise various modules including, for example, a metric collection module 132a, an error handling module 134a, an error replication module 136a, and/or other modules.

Metric collection module 132a (of testing module 130a) may be configured to collect and store, at non-transitory electronic storage media 140a, metrics from the execution of a test application, and metrics from the operation of mobile device 100a. For example, for each operation of the test application performed, metric collection module 132a may collect and/or store information related to one or more prior operations performed, a state of the test application, a state of mobile device 100a, one or more parameters associated with the operation, one or more inputs to the operation, one or more outputs from the operation, a result of the operation, an associated test script, and/or other information related to the operation. The operations performed by the test application may correspond to one or more operations in one more test scripts related to the test application. For example, the test scripts may be performed by a user of mobile device 100a, may be automatically executed by mobile device 100a, may be automatically executed by testing module 130a, and/or may be performed in other ways. In one implementation, one or more operations performed may be random operations that do not correspond to a test script.

Metric collection module 132a may collect and store, at non-transitory electronic storage media 140a, information related to operation of mobile device 100a. For example, metric collection module 132a may collect and store information related to when an application (including, for example, the test application) crashes on the mobile device 100a, when mobile device 100a is unable to perform any operation related to any application, whether a reset of the operating system occurred, device temperature, battery usage, cellular data usage, Wi-Fi data usage, network state, whether any phone calls were dropped, information related to logs stored via operation of the mobile device, and/or other information related to operation of mobile device 100a.

Metric collection module 132a may transmit information related to execution of the test application and operation of mobile device 100a to computing device 40. For example, metric collection module 132a may transmit information at pre-determined intervals, based on a request by computing device 40, based on a request by a user of mobile device 100a, and/or in response to other information or events.

Error handling module 134a of testing module 130a may be configured to detect errors that occur in the test application, transmit information relating to detected errors to other mobile devices 100b, ..., 100n, receive information relating to replication attempts from other mobile devices 100b, ... 100n, determine whether an error occurred at one or more other mobile devices 100b, ... 100n, determine characteristics relating to detected errors based on replication information from other mobile devices 100b, ... 100n, and/or perform other functionality related to error handling.

When an operation is associated with a test script, non-transitory electronic storage media 140a may store information relating to expected results based on execution of the operation. Error handling module 134a may compare information collected by metric collection module 132a relating to an operation and information stored at non-transitory electronic storage media 140a relating to the operation. In response to a determination that information collected by metric collection module 132a does not match information relating to expected results, error handling module 134a may indicate that an error occurred with the operation.

Non-transitory electronic storage media 140a may store information related to one or more events that indicate that an error occurred. The information related to the one or more events may indicate that an error occurred with an operation of the test application, with operation of mobile device 100a, and/or that another type of error occurred. Error handling module 134a may compare information collected by metric collection module 132a relating to the operation and information stored at non-transitory electronic storage media 140a relating to the one or more events. In response to a determination that information collected by metric collection module 132a matches information relating to one or more events, the error handling module 134a may indicate that an error occurred with the operation.

In response to an indication by error handling module 134a that an error occurred, error handling module 134a may augment stored information relating to the operation with an indication that an error occurred with the operation. In one implementation, non-transitory electronic storage media 140a may store information related to the error separately from information collected by metric collection module 132a. For example, non-transitory electronic storage media 140a may store error information related to the error in an error log. The error information may include, for example, one or more of an identification of the test application, an identification of the operation at which the error occurred, one or more parameters associated with the operation at which the error occurred, input data for the operation at which the error occurred, output data for the operation at which the error occurred, one or more results of the operation at which the error occurred, information related to one or more operations that occurred before the operation at which the error occurred, one or more parameters for each of the one or more operations, input data for each of the one or more operations, output data for each of the one or more operations, a state of the test application when the error occurred, an associated test script, and/or other information related to the error. In one implementation, error handling module 134 may transmit error information related to the error to computing device 40 in response to a determination that the error occurred, at predetermined intervals during execution of the test application, and/or in response to other information.

In one implementation, a format for error information may comprise, for example, a first portion related to a magic number, a second portion related to a timestamp, a third portion related to a type of data, a fourth portion related to length of the record, a fifth portion related to context specific data, and/or other portions that describe a format for the record. For example, a timestamp may comprise a number of milliseconds represented as a 48 bit unsigned integer. A type of data may be a 16-bit unsigned integer, a 16 bit signed integer, a string, and/or other type of data. A length of the record may be represented as a 16-bit unsigned integer. Context-specific data may comprise, for example, logcat, kmsg, and/or other context-specific data.

In response to a determination that an error occurred with an operation, error handling module 134a may transmit error information relating to the error to other mobile devices 100b, ..., 100n. Error handling module 134a may transmit error information relating to the error to mobile devices 100b, ..., 100n included in a list stored in non-transitory electronic storage media 140a. In one implementation, error handling module 134a may request, from computing device 40, a list of mobile devices 100b, ..., 100n to which to transmit error information. In one implementation, error handling module 134a may broadcast the error information over network 20 such that all other devices 100b, ..., 100n connected to network 20 may receive the error information. In one implementation, error handling module 134a may transmit data to a multicast socket at computing device 40 via which the data may be broadcast to all mobile devices 100b, ..., 100n able to connect to the multicast socket.

In response to transmission of the error information to other mobile devices 100b, ..., 100n, error handling module 134a may receive replication information from one or more other mobile devices 100b, ..., 100n regarding the error information. In one implementation, computing device 40 may receive replication information from one or more other mobile devices 100b, ..., 100n. The replication information may comprise information related to results of an attempt to replicate the error by other mobile devices 100b, ..., 100n. The replication information may include information relating to the mobile device 100n from which the replication information was received. For example, the replication information may include information relating to attributes of mobile device 100n from which the replication information was received, such as, for example, hardware of mobile device 100n, operating system, operating system version, and/or other attributes. Error handling module 134a may determine whether another mobile device 100n was able to replicate the error based on a comparison of the replication information received from other mobile device 100n and the error information relating to the operation at which the error occurred.

In response to a determination of which mobile devices 100b, ..., 100n were able to replicate the error, error handling module 134a may determine characteristics relating to the error. For example, error handling module 134a may determine that the error may occur at mobile devices 100b, ..., 100n that share one or more attributes such as, for example, a hardware component, an operating system, a version of an operating system, and/or other attributes.

Error replication module 136a of testing module 130a may be configured to receive error information to replicate an error that occurred at another mobile device 100n, store results related to an error replication attempt, send the results to another mobile device 100n and/or to computing device 40, and/or perform other functionality related to error replication.

Error replication module 136a may receive error information from another mobile device 100n. The error information may comprise, for example, an identifier relating to a test application, an operation during which the error occurred, information relating to one or more operations to be executed to reproduce the error, state information relating to the test application when the error occurred, state information relating to mobile device 100n when the error occurred, data inputs to the operation and to any operations that preceded the operation at which the error occurred, a test script comprising the operations executed (and corresponding data inputs) to reproduce the error, and/or other information related to the error and/or its reproduction.

In response to a determination that the error information includes information related to a test script, error replication module 136a may attempt to automatically replicate the error by executing the relevant operations set forth in the test script.

In one implementation, the error information may comprise a link to the test application. In response to receipt of user input that accesses the link to the test application, error replication module 136a may open the test application. Error replication module 136a may automatically execute the operations of the test application using data inputs received in the error information to attempt to reproduce the error. In one implementation, error replication module 136a may open the test application and may display instructions regarding how to replicate the error. The error replication module 136a may receive user input to execute the operations to reproduce the error.

In response to the execution of an operation by error replication module 136a, metric collection module 132a of mobile device 100a may collect information relating to the operation. Responsive to error replication module 136a executing the operation at which the error occurred, error replication module 136a may communicate the information collected by metric collection module 132a for the operation to mobile device 100n from which it received the error information.

Referring again to FIG. 2, a mobile device may act as a sending device 100a when an error occurs during testing of the test application at the mobile device. A mobile device may also act as a receiving device 100n when receiving information related to an error that occurred during testing of the test application at sending device 100a. In response to a determination that an error occurred at sending device 100a, one or more mobile devices may act as respective one or more receiving devices 100b, . . . , 100n. Receiving device 100n may perform the functionality of error replication module 136a of testing module 130a. Both sending device 100a and receiving device 100n may perform some or all of the functionality of error handling module 134a of testing module 130a.

Computing Device

According to an aspect of the invention, computing device 40 may comprise a non-transitory electronic storage media 50 configured to store information related to field user testing of one or more test applications, one or more physical processors 42 configured to execute one or more computer modules, and/or other components. The one or more computer modules of computing device 40 may comprise, for example, a network module 44 configured to facilitate communication with network 20 and with plurality of mobile devices 100a, 100b, . . . , 100n, an error analysis module 46 configured to provide analysis related to a test application, a reporting module 48 configured to facilitate analysis and report information related to information stored at non-transitory electronic storage media 50, and/or other modules.

Computing device 40 may be any computing device such as, for example, a server, a desktop computer, laptop computer, personal digital assistant, smart phone, tablet, and/or any other computing device. Computing device 40 may be capable of communicating with one or more mobile devices 100a, 100b, . . . , 100n over network 20. Computing device 40 may also include other components typically found in computing devices, including, for example, user input features (e.g., a touch screen, microphone, keyboard, and/or other user input features), speakers, an antenna (and the corresponding signal processing capabilities), and other features. Other computing devices at system 10 may include similar features.

Processor 42 may provide information processing capabilities within computing device 40, As such, processor 42 may include one or more of a digital processor, an analog processor, a digital circuit designed to process information, an analog circuit designed to process information, a state machine, and/or other mechanisms for electronically processing information. Although processor 42 is shown in FIG. 2 as a single entity, this is not intended to be limiting, as processor 42 may include a plurality of processors operating in coordination or cooperation. This may include implementations in which computing device 40 includes a multi-processor device, a farm of server devices operating together, and/or virtual resources provided by the cloud, Processor 42 may be configured to execute modules 44, 46, and/or 48. Processor 42 may be configured to execute modules 44, 46, and/or 48 by software, hardware, firmware, some combination of software, hardware, and/or firmware, and/or other mechanisms for configuring processing capabilities on processor 42.

It should be appreciated that although modules 44, 46, and/or 48 are illustrated in FIG. 2 as being co-located within a single computing device, in implementations in which processor 42 includes multiple processing units, one or more of modules 44, 46, and/or 48 may be located remotely from the other modules. The description of the functionality provided by the different modules 44, 46, and/or 48 described below is for illustrative purposes, and is not intended to be limiting, as any of modules 44, 46, and/or 48 may provide more or less functionality than is described. For example, one or more of modules 44, 46, and/or 48 may be eliminated, and some or all of its functionality may be provided by other ones of modules 44, 46, and/or 48. As another example, processor 42 may be configured to execute one or more additional modules that may perform some or all of the functionality attributed below to one of modules 44, 46, and/or 48.

Non-transitory electronic storage media 50 may comprise electronic storage media that electronically stores information non-transiently. The electronic storage media of non-transitory electronic storage media 50 may include one or both of system storage that is provided integrally (i.e., substantially non-removable) with computing device 40 and/or removable storage that is removably connectable to computing device 40 via, for example, a port (e.g., a USB port, a firewire port, etc.) or a drive (e.g., a disk drive, etc.). Non-transitory electronic storage media 50 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Non-transitory electronic storage media 50 may include one or more virtual storage resources (e.g., cloud storage, a virtual private network, and/or other virtual storage resources). Non-transitory electronic storage media 50 may store software algorithms, information determined by processor 42, information received from computing device 40, information received from one or more mobile devices 100a, 100b, . . . , 100n, and/or other information that enables computing device 40 to function as described herein.

In some implementations, non-transitory electronic storage media 50 may comprise at least one database that stores system data such as information related to system usage, customer information, distillery content, and/or other data. Non-transitory electronic storage media 50 may be associated and communicate with computing device 40. For example, one or more databases comprising non-transitory electronic storage media 50 may be, include, or interface to, for example, an Oracle™ relational database sold commercially by Oracle Corporation. Other databases, such as Informix™, DB2 (Database 2) or other data storage, including file-based, object, or query formats, platforms, or resources such as OLAP (On Line Analytical Processing), SQL (Standard Query Language), NoSQL, a SAN (storage area network), Microsoft Access™ or other form of database may also be used, incorporated, or accessed. The database may comprise one or more such databases that reside in one or more physical devices and in one or more physical locations. The database may store a plurality of types of data and/or files and associated data or file descriptions, administrative information, or any other data.

In some implementations, non-transitory electronic storage media 50 may be part of or hosted by a computing device on network 20. In some implementations, non-transitory electronic storage media 50 may be part of or hosted by computing device 40. In some implementations, non-transitory electronic storage 50 may be physically separate from computing device 40 but may be operably communicable therewith.

Non-transitory electronic storage media 50 (of computing device 40) may be configured to store one or more test applications, information related to one or more mobile devices 100a, 100b, . . . , 100n, information related to one or more operations performed by the test application at one or more mobile devices 100a, 100b, . . . , 100n, error information received from one or more mobile devices 100a, 100b, . . . , 100n, replication information received from one or more mobile devices 100a, 100b, . . . , 100n, data related to analysis of the one or more test applications, and/or other information related to field user testing of the one or more test applications. In one implementation, non-transitory electronic storage media 50 may comprise an error log configured to store information relating to one or more errors that occurred during testing of a test application. In one implementation, non-transitory electronic storage media 50 may store a list of mobile devices 100a, 100b, . . . , 100n to which the test application is deployed. The list may include attributes related to one or more of mobile devices 100a, 100b, . . . , 100n.

For each test application, non-transitory electronic storage media 50 may store information relating to expected results based on execution of operations of the test application. Non-transitory electronic storage media 50 may store information related to one or more events that indicate that an error occurred. The information related to the one or more events may indicate that an error occurred with an operation of the test application, with operation of mobile device 100n, and/or that another type of error occurred.

Error analysis module 46 (of computing device 40) may be configured to receive, from sending device 100a, information related to one or more operations performed by the test application at sending device 100a. For example, error analysis module 46 may be configured to receive the information from sending device 100a at pre-determined intervals, in response to a request for the information transmitted from computing device 40 to sending device 100a, and/or in response to other information. In one implementation, error analysis module 46 may be configured to transmit the received information to one or more receiving devices 100b, . . . , 100n.

Error analysis module 46 may compare received information relating to an operation and information stored at non-transitory electronic storage media 50 relating to the operation. In response to a determination that received information does not match stored information relating to expected results, error analysis module 46 may indicate that an error occurred with the operation.

Error analysis module 46 may compare received information and information stored at non-transitory electronic storage media 50 relating to the one or more events. In response to a determination that received information matches information relating to one or more events, error analysis module 46 may indicate that an error occurred with the operation.

Error analysis module 46 may be configured to also receive error information related to an error that occurred with an operation of the test application.

Error analysis module 46 may store; at an error log of non-transitory electronic storage media 50, received information relating to an operation at which an error occurred, received error information, and/or other information relating to an error that occurred at sending device 100a. Computing device 40 may facilitate access, for an application developer associated with a test application, to information at the error log associated with the test application.

In one implementation, error analysis module 46 may receive replication information from one or more receiving devices 100b, . . . , 100n. The replication information may comprise information related to results of an attempt to replicate the error by one or more receiving devices 100b, . . . , 100n. The replication information may include information relating to receiving device 100n from which the replication information was received. For example, the replication information may include information relating to attributes of receiving device 100n from which the replication information was received, such as, for example, hardware of receiving device 100n, operating system, operating system version, and/or other attributes. In one implementation, a list of receiving devices 100b, . . . , 100n accessible by error analysis module 46 may include information relating to attributes of respective receiving devices 100b, . . . , 100n. Error analysis module 46 may determine whether receiving device 100n was able to replicate the error based on a comparison of the replication information received from receiving device 100n and corresponding error information.

In one implementation, error analysis module 46 may compare replication information received from one or more receiving devices 100b, . . . , 100n to which the error information was transmitted. Based on which receiving devices 100b, . . . , 100n were able to replicate the error, error analysis module 46 may determine attributes of mobile devices 100b, . . . , 100n associated with the error. For example, error analysis module 46 may determine that the error may occur at mobile devices 100b, . . . , 100n that share one or more attributes such as, for example, a specific piece of hardware, a type of operating system, a version of an operating system, and/or other attributes. Error analysis module 46 may store, at the error log, information relating to characteristics relating to the error. In one implementation, error analysis module 46 may augment information stored at the error log relating to the error with information relating to attributes associated with devices 100b, . . . , 100n that produce the error.

Reporting module 48 may be configured to facilitate analysis and report information related to information stored at non-transitory electronic storage media 50. For example, reporting module 48 may be configured to provide, for a test application, one or more reports related to errors that occurred during testing of the test application, one or more reports comprising information from the error log of non-transitory electronic storage media 50 of computing device 40, one or more reports related to error information from sending device 100a and replication information from one or more receiving devices 100b, . . . , 100n, and/or other information related to field user testing of the test application. In one implementation, reporting module 48 may be configured to prepare and/or display reports including statistics regarding field user testing of one or more test applications. The types of reports prepared by reporting module 48 are not limited to the examples described herein.

In one implementation, reporting module 48 may facilitate a search for information related to field user testing of one or more test applications. For example, reporting module 48 may facilitate a search for errors that occurred at mobile devices 100b, . . . , 100n with a set of specific attributes. In another example, reporting module 48 may facilitate a search for errors that were replicated in other mobile devices. The types of searches facilitated by reporting module 48 are not limited to the examples described herein.

Reporting module 48 may generate reports relating to field user testing of one or more test applications at pre-determined time intervals, in response to a request by an application developer, in response to a request by a user of a mobile device, upon completion of field user testing for a test application, and/or at other times.

Implementations of the invention may be made in hardware, firmware, software, or any suitable combination thereof. Aspects of the invention may also be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described herein in terms of specific exemplary aspects and implementations of the invention, and performing certain actions. However, it will be apparent that such descriptions are merely for convenience and that such actions in fact result from computing devices, processors, controllers, or other devices executing the firmware, software, routines, or instructions.

Figure 4:
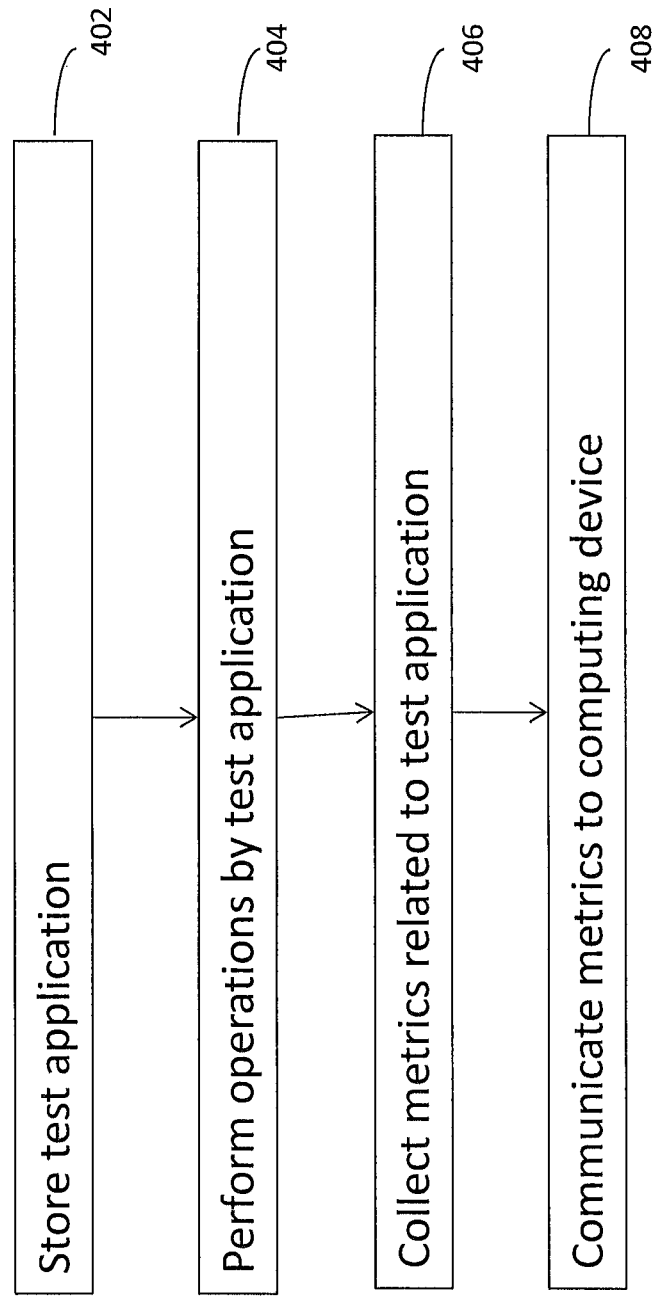
FIG. 4 illustrates a flowchart of an exemplary method of coordinating field user testing results for a mobile application across various mobile devices, according to an aspect of the invention.

FIG. 4 illustrates a flowchart of an exemplary method of coordinating field user testing results for a mobile application across various mobile devices 100a, 100b, . . . , 100n, according to an aspect of the invention. The various processing operations depicted in the flowchart of FIG. 4 are described in greater detail herein. The described operations may be accomplished using some or all of the system components described in detail above and, in some implementations, various operations may be performed in different sequences. In other implementations, additional operations may be performed along with some or all of the operations shown in FIG. 4, while some operations may be omitted. In yet other implementations, one or more operations may be performed simultaneously, Accordingly, the operations as illustrated (and described in greater detail below) are exemplary in nature and, as such, should not be viewed as limiting.

In an operation 402, a test application may be stored on one or more mobile devices 100a, 100b, . . . , 100n. For example, the test application may be stored on mobile device 100a before mobile device 100a is made available to a user to test the application, may be received via computing device 40 (e.g., via a download), may be received via network 20, may be received via an application store accessible via mobile device 100a, may be received via another application accessible via mobile device 100a, may be uploaded from an electronic storage media, may be received from one or more devices at a cloud computing environment that hosts computing device 40, and/or may be obtained in other ways. In an implementation in which test scripts are used during testing of the test application, one or more test scripts associated with the test application may be stored at mobile device 100a, accessed from computing device 40 (e.g., via a download), accessed from another device via network 20, uploaded from another device, obtained in a same or similar manner as the test application, and/or obtained in other ways.

In an operation 404, test application may perform one or more operations on mobile device 100a. For example, an operation may be automatically performed according to a test script associated with the test application. In another example, a user may perform one or more operations by the test application.

In an operation 406, metric collection module 132a may collect metrics related to the operations performed. For example, metric collection module 132a may collect and store, at non-transitory electronic storage media 140a, metrics from the execution of a test application, and metrics from the operation of mobile device 100a. For example, for each operation of the test application performed, metric collection module 132a may collect and/or store information related to one or more prior operations performed, a state of the test application, a state of mobile device 100a, one or more parameters associated with the operation, one or more inputs to the operation, one or more outputs from the operation, a result of the operation, an associated test script, and/or other information related to the operation.

In an operation 408, collected metrics may be communicated to computing device 40. For example, metric collection module 132a may transmit information related to execution of the test application and operation of mobile device 100a to computing device 40. The transmitted information may include the collected metrics relating to the operations performed by the test application on mobile device 100a.

Figure 5:
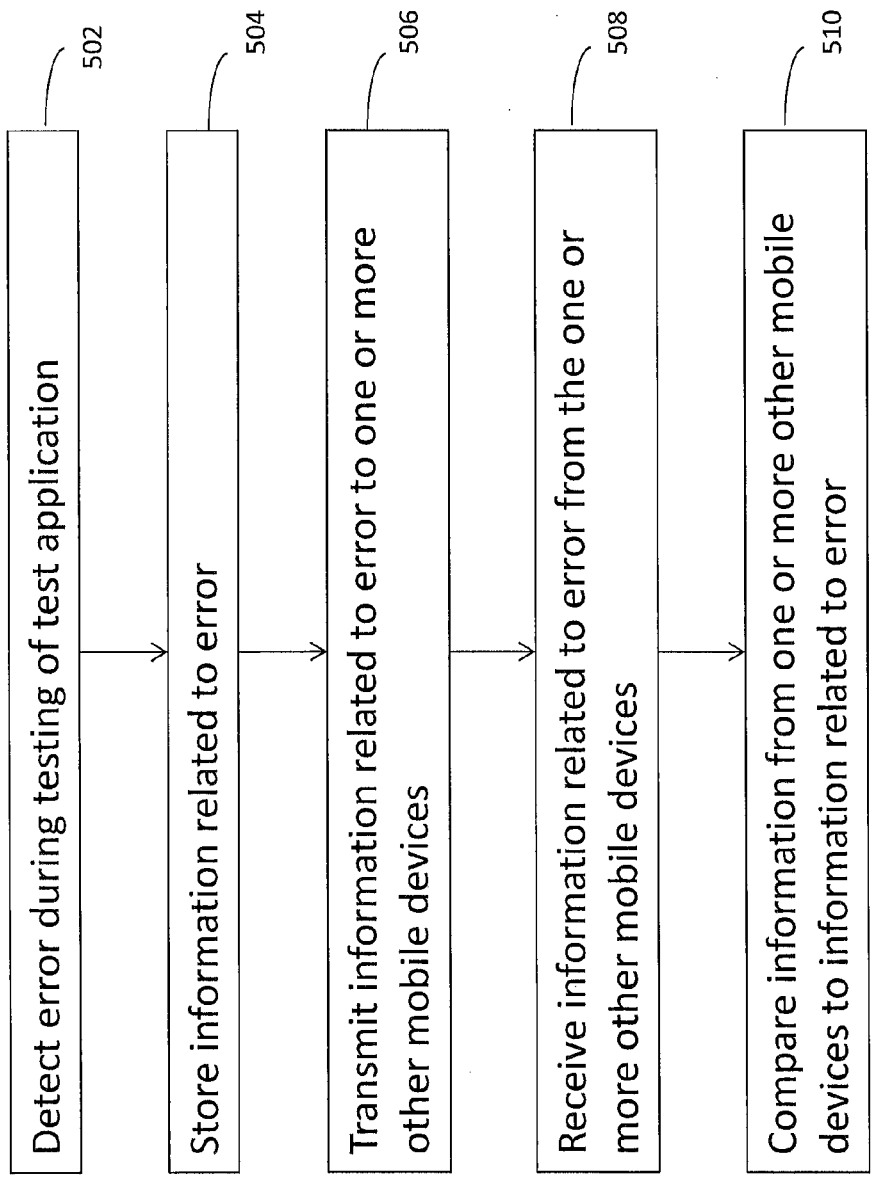
FIG. 5 illustrates a flowchart of an exemplary method of coordinating field user testing results for a mobile application across various mobile devices, according to an aspect of the invention.

FIG. 5 illustrates a flowchart of an exemplary method of coordinating field user testing results for a mobile application across various mobile devices, according to an aspect of the invention. The various processing operations depicted in the flowchart of FIG. 5 are described in greater detail herein. The described operations may be accomplished using some or all of the system components described in detail above and, in some implementations, various operations may be performed in different sequences. In other implementations, additional operations may be performed along with some or all of the operations shown in FIG. 5, while some operations may be omitted. In yet other implementations, one or more operations may be performed simultaneously. Accordingly, the operations as illustrated (and described in greater detail below) are exemplary in nature and, as such, should not be viewed as limiting.

In an operation 502, an error may be detected during testing of the test application at mobile device 100a. For example, error handling module 134a may compare information collected by metric collection module 132a relating to an operation and information stored at non-transitory electronic storage media 140a relating to the operation. In response to a determination that information collected by metric collection module 132a does not match information relating to the operation stored at non-transitory electronic storage media 140a, error handling module 134a may indicate that an error occurred with the operation. In another example, error handling module 134a may compare information collected by metric collection module 132a relating to the operation and information stored at non-transitory electronic storage media 140a relating to the one or more events. In response to a determination that information collected by metric collection module 132a matches information relating to one or more events, error handling module 134a may indicate that an error occurred with the operation.

In an operation 504, error information related to the error may be stored. In one implementation, error handling module 134a may augment stored information relating to the operation with an indication that an error occurred with the operation. In one implementation, non-transitory electronic storage media 140a may store information related to the error separately from information collected by metric collection module 132a. For example, non-transitory electronic storage media 140a may store error information related to the error in an error log. The error information may include, for example, one or more of an identification of the test application, an identification of the operation at which the error occurred, one or more parameters associated with the operation at which the error occurred, input data for the operation at which the error occurred, output data for the operation at which the error occurred, one or more results of the operation at which the error occurred, information related to one or more operations that occurred before the operation at which the error occurred, one or more parameters for each of the one or more operations, input data for each of the one or more operations, output data for each of the one or more operations, a state of the test application when the error occurred, an associated test script, and/or other information related to the error.

In an operation 506, error information may be transmitted to other mobile devices 100b, . . . , 100n. For example, error handling module 134a may transmit error information relating to the error to other mobile devices 100b, . . . , 100n. Error handling module 134a may transmit error information relating to the error to mobile devices 100b, . . . , 100n included in a list stored in non-transitory electronic storage media 140a. In one implementation, error handling module 134a may request, from computing device 40, a list of mobile devices 100b, . . . , 100n to which to transmit error information. In one implementation, error handling module 134a may broadcast the error information over network 20 such that all other devices 100b, . . . , 100n connected to network 20 may receive the error information. In one implementation, error handling module 134a may transmit data to a multicast socket at computing device 40 via which the data may be broadcast to all mobile devices 100b, . . . , 100n able to connect to the multicast socket.

In an operation 508, replication information related to the error may be received from one or more other mobile devices 100b, . . . , 100n. For example, error handling module 134b may receive replication information from one or more other mobile devices 100b, . . . , 100n regarding the error information. In one implementation, computing device 40 may receive replication information from one or more other mobile devices 100b, . . . , 100n. The replication information may comprise information related to results of an attempt to replicate the error by other mobile devices 100b, . . . , 100n. The replication information may include information relating to mobile device 100n from which the replication information was received. For example, the replication information may include information relating to attributes of mobile device 100n from which the replication information was received, such as, for example, hardware of mobile device 100n, operating system, operating system version, and/or other attributes.

In an operation 510, the replication information from the one or more other mobile devices 100b, . . . , 100n may be compared to the error information related to the error that occurred during testing of the test application at mobile device 100a. For example, error handling module 134a may determine whether another mobile device 100n was able to replicate the error based on a comparison of the replication information received from other mobile device 100n and the error information relating to the operation at which the error occurred. In one implementation, error handling module 134a may determine characteristics relating to the error. For example, error handling module 134a may determine that the error may occur at mobile devices 100b, . . . , 100n that share one or more attributes such as, for example, a hardware component, an operating system, a version of an operating system, and/or other attributes.

Figure 6:
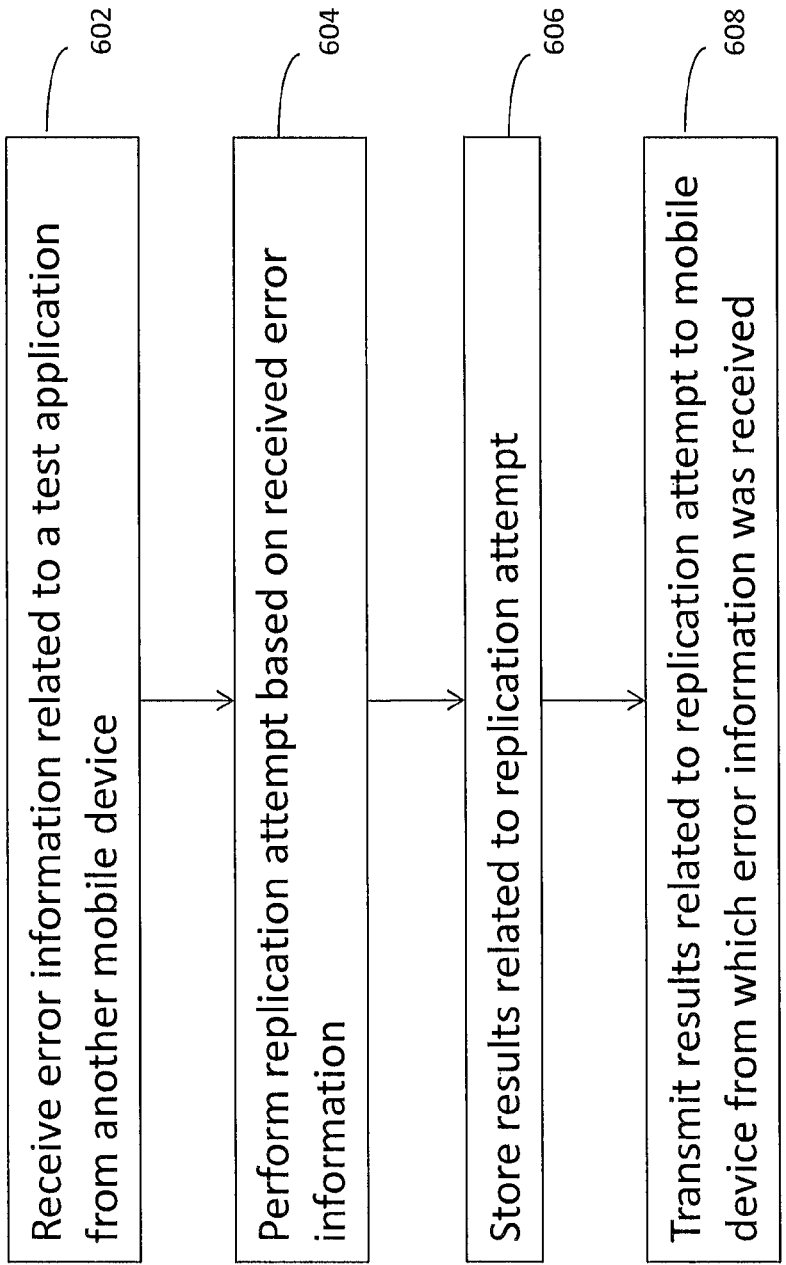
FIG. 6 illustrates a flow chart of an exemplary method of coordinating field user testing results for a mobile application across various mobile devices, according to an aspect of the invention.

FIG. 6 illustrates a flow chart of an exemplary method of coordinating field user testing results for a mobile application across various mobile devices, according to an aspect of the invention. The various processing operations depicted in the flowchart of FIG. 6 are described in greater detail herein. The described operations may be accomplished using some or all of the system components described in detail above and, in some implementations, various operations may be performed in different sequences. In other implementations, additional operations may be performed along with some or all of the operations shown in FIG. 6, while some operations may be omitted. In yet other implementations, one or more operations may be performed simultaneously. Accordingly, the operations as illustrated (and described in greater detail below) are exemplary in nature and, as such, should not be viewed as limiting.

In an operation 602, error information relating to an error that occurred during testing of a test application at another mobile device 100a may be received. For example, error replication module 136a may receive error information from another mobile device 100n. The error information may comprise, for example, an identifier relating to a test application, an operation during which the error occurred, information relating to one or more operations to be executed to reproduce the error, state information relating to the test application when the error occurred, state information relating to mobile device 100n when the error occurred, data inputs to the operation and to any operations that preceded the operation at which the error occurred, a test script comprising the operations executed (and corresponding data inputs) to reproduce the error, and/or other information related to the error and/or its reproduction.

In an operation 604, mobile device 100n may perform a replication attempt based on the received error information. In one implementation, error replication module 136n may attempt to automatically replicate the error by executing the relevant operations set forth in the test script. In one implementation, the error information may comprise a link to the test application. In response to receipt of user input that accesses the link to the test application, error replication module 136n may open the test application. Error replication module 136n may automatically execute the operations of the test application using data inputs received in the error information to attempt to reproduce the error. In one implementation, error replication module 136n may open the test application and may display instructions regarding how to replicate the error. Error replication module 136n may receive user input to execute the operations to reproduce the error.

In an operation 606, replication information related to the attempt to replicate the error may be stored. For example, metric collection module 132n of mobile device 100n may collect replication information relating to the attempt to replicate the error. The replication information may comprise information related to results of an attempt to replicate the error by mobile device 100n. The replication information may include information relating to mobile device 100n. For example, the replication information may include information relating to attributes of mobile device 100n, such as, for example, hardware of mobile device 100n, operating system, operating system version, and/or other attributes.

In an operation 608, replication information may be transmitted to mobile device 100a from which the error information was received. For example, error replication module 136n may communicate the information collected by metric collection module 132n for the operation to mobile device 100a from which it received the error information.

Figure 7:
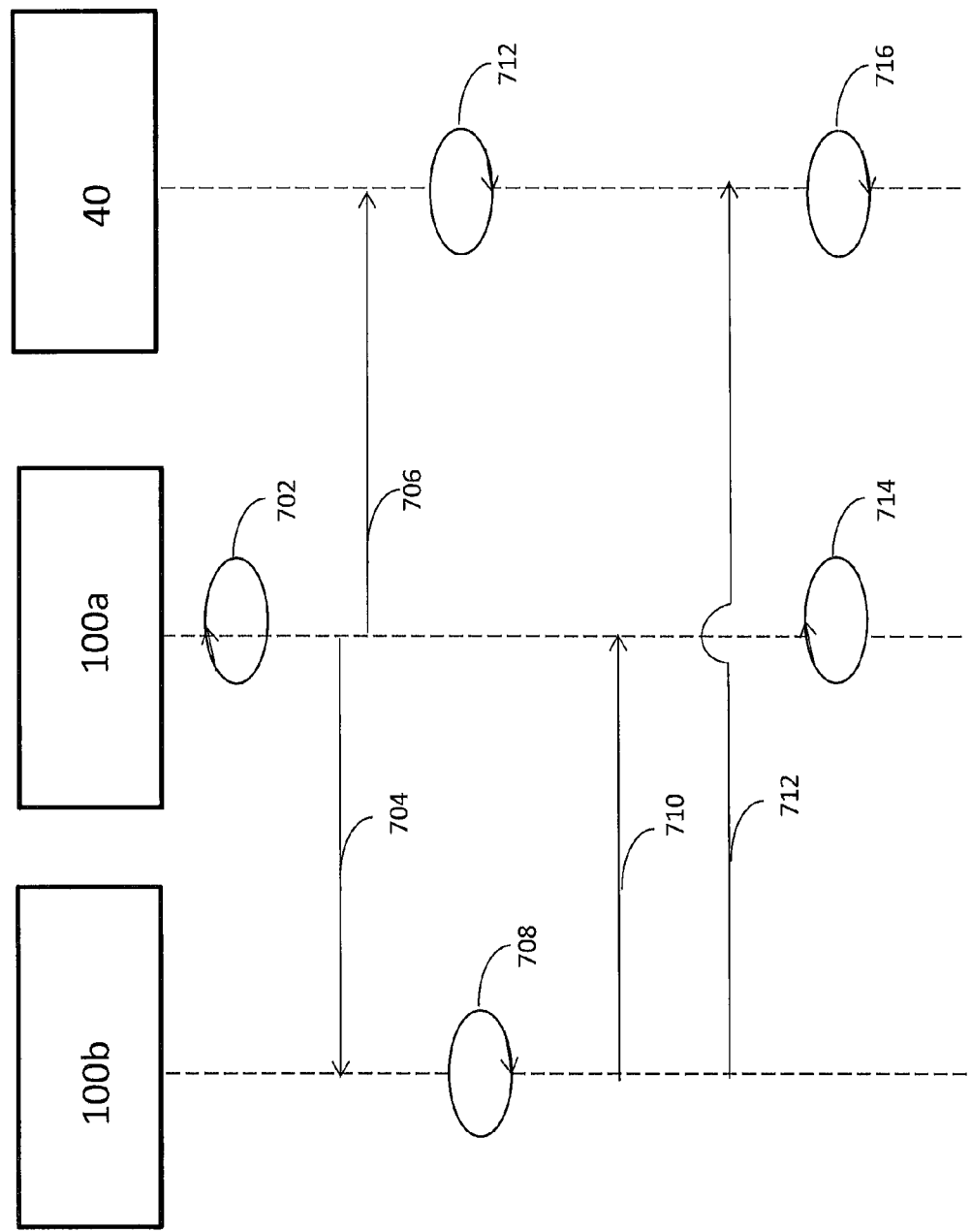
FIG. 7 illustrates a data flow diagram of an exemplary method of coordinating field user testing results for a mobile application across various mobile devices, according to an aspect of the invention.

FIG. 7 illustrates a data flow diagram of an exemplary method of coordinating field user testing results for a mobile application across various mobile devices, according to an aspect of the invention. The various processing operations depicted in the data flow diagram of FIG. 7 are described in greater detail herein. The described operations may be accomplished using some or all of the system components described in detail above and, in some implementations, various operations may be performed in different sequences. In other implementations, additional operations may be performed along with some or all of the operations shown in FIG. 7, while some operations may be omitted. In yet other implementations, one or more operations may be performed simultaneously. Accordingly, the operations as illustrated (and described in greater detail below) are exemplary in nature and, as such, should not be viewed as limiting.

Many of the operations set, forth in FIG. 7 are similar to those discussed above in relation to FIGS. 4, 5 and 6. For example, operations 702, 704, 708, 710, 714 are similar to operations 404, 506, 604, 608, 510 respectively, and therefore will not be described again.

In one implementation, in operation 702, mobile device 100a may perform operations by the test application.

Responsive to a determination that an error occurred with an operation of the test application, mobile device 100a may transmit error information related to the error to another mobile device 100b in an operation 704.

In an operation 706, mobile device 100a may transmit the error information related to the error to computing device 40. For example, error handling module 134a may transmit error information related to the error to computing device 40 in response to a determination that the error occurred, at predetermined intervals during execution of the test application, and/or in response to other information.

In an operation 708, mobile device 100n may attempt to replicate the error based on the error information received from mobile device 100a.

In an operation 710, mobile device 100n may transmit, to mobile device 100a, replication information related to the attempt to replicate the error.

In an operation 712, mobile device 100n may transmit, to computing device 40, replication information related to the attempt to replicate the error. For example, error replication module 136n of mobile device 100n may communicate the information collected by metric collection module 132n during an attempt to replicate the error to computing device 40.

In an operation 714, mobile device 100a may compare the replication information received from mobile device 100n to determine whether mobile device 100n was able to replicate the error.

In an operation 716, computing device 40 may compare the replication information received from mobile device 100n with the error information received from mobile device 100a to determine whether mobile device 100n was able to replicate the error. For example, error analysis module 46 of computing device 40 may compare replication information received from one or more receiving devices 100b, . . . , 100n to which the error information was transmitted. Based on which receiving devices 100b, . . . , 100n were able to replicate the error, error analysis module 46 may determine attributes of mobile devices 100b, . . . , 100n associated with the error. For example, error analysis module 46 may determine that the error may occur at mobile devices 100b, . . . , 100n that share one or more attributes such as, for example, a specific piece of hardware, a type of operating system, a version of an operating system, and/or other attributes. Error analysis module 46 may store, at the error log, information relating to characteristics relating to the error. In one implementation, error analysis module 46 may augment information stored at the error log relating to the error with information relating to attributes associated with devices 100b, . . . , 100n that produce the error.

Aspects and implementations described herein as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other aspects or implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A mobile device programmed to perform field testing using a test application, comprising:
   one or more physical processors programmed with computer program instructions, the computer program instructions, when executed by the one or more physical processors, program the mobile device to:
   execute one or more operations of the test application;
   obtain one or more metrics related to the execution of the one or more operations;
   determine whether an error occurred with an operation, from among the one or more operations, based on the one or more metrics;
   cause error information relating to the error to be transmitted to one or more other mobile devices responsive to a determination that the error occurred with the operation, wherein the error information includes information used to replicate the error;
   receive, back from at least a first other mobile device among the one or more other mobile devices, replication information relating to an attempt by the first other mobile device to replicate the error; and
   determine whether the first other mobile device replicated the error based on the replication information.

2. The mobile device of claim 1, further comprising:
   non-transitory electronic storage media configured to store one or more test scripts relating to the test application, an individual test script comprising the one or more operations to be performed in a set order.

3. The mobile device of claim 2, wherein the mobile device is further programmed to determine that the error occurred with the operation based on a comparison of the one or more metrics and expected results associated with the operation.

4. The mobile device of claim 1, further comprising:
   non-transitory electronic storage media configured to store one or more events, an individual event comprising information indicating that an error occurred with one or more of the test application and the mobile device.

5. The mobile device of claim 4, wherein the mobile device is further programmed to determine that the error occurred with the operation based on a comparison of the one or more metrics and the stored one or more events.

6. The mobile device of claim 1, wherein the mobile device is further programmed to:
transmit, at one or more pre-determined intervals, the one or more metrics to a computing device remote from the mobile device and the one or more other mobile devices.

7. The mobile device of claim 1, wherein the mobile device is further programmed to:
transmit the error information to the computing device.

8. The mobile device of claim 1, wherein the mobile device is further programmed to:
obtain at least a first attribute of the first other mobile device responsive to a determination that the first other mobile device replicated the error;
determine that the mobile device shares the first attribute in common with the first other mobile device; and
identify the first attribute as being a possible cause of the error.

9. The mobile device of claim 8, wherein the first attribute comprises at least one of a hardware component, an operating system, or an operating system version.

10. The mobile device of claim 1, wherein the error information includes a link to the test script, wherein the test script is used to automatically attempt to replicate the error.

11. The mobile device of claim 1, wherein the error information includes one or more instructions that causes the first other mobile device to prompt an end user to perform the operation at the first other mobile device to attempt to replicate the error.

12. The mobile device of claim 1, wherein the mobile device is further programmed to:
receive, from at least a second other mobile device, second error information relating to a second error at the second other mobile device;
determine at least a second operation to execute to attempt to replicate the second error;
execute the second operation;
collect one or more second metrics related to the execution of the second operation; and
determine whether the second error was replicated based on the one or more second metrics.

13. The mobile device of claim 12, wherein the mobile device is further programmed to:
cause second replication information that indicates that the second error was replicated to be transmitted to a device remote from the mobile device responsive to a determination that the second error was replicated.

14. The mobile device of claim 13, wherein the device remote from the mobile device comprises at least one of the one or more other mobile devices or a computing device remote from the mobile device and the one or more other mobile devices.

15. The mobile device of claim 1, wherein the mobile device is further programmed to:
identify the one or more other mobile devices to which to transmit the error information based on a list of one or more mobile devices stored at the non-transitory electronic storage media.

16. The mobile device of claim 1, wherein the mobile device is further programmed to:
cause a request for a list of one or more mobile devices to which the error information should be provided to be transmitted to a computing device remote from the mobile device and the one or more other mobile devices;
obtain the list of one or more mobile devices based on the request; and
identify the one or more other mobile devices to which to transmit the error information based on the list of one or more other mobile devices.

17. The mobile device of claim 1, wherein to cause the error information relating to the error to be transmitted to the one or more other mobile devices, the mobile device is further programmed to:
cause the error information to be transmitted to a multicast socket of a computing device remote from the mobile device and the one or more other mobile devices.

18. The mobile device of claim 1, wherein the computer program instructions is part of an operating system of the mobile device.

19. A method of performing field testing using a test application, the method being implemented in a mobile device comprising one or more physical processors programmed with computer program instructions that, when executed by the one or more physical processors, program the mobile device to perform the method, the method comprising:
executing, by the mobile device, one or more operations of the test application;
obtaining, by the mobile device, one or more metrics related to the execution of the one or more operations;
determining, by the mobile device, whether an error occurred with an operation, from among the one or more operations, based on the one or more metrics;
causing, by the mobile device, error information relating to the error to be transmitted to one or more other mobile devices responsive to a determination that the error occurred with the operation, wherein the error information includes information used to replicate the error;
receiving, by the mobile device back from at least a first other mobile device among the one or more other mobile devices, replication information relating to an attempt by the first other mobile device to replicate the error; and
determining, by the mobile device, whether the first other mobile device replicated the error based on the replication information.

20. The method of claim 19, further comprising:
storing, at non-transitory electronic storage media of the mobile device, one or more test scripts relating to the test application, an individual test script comprising one or more operations to be performed in a set order.

21. The method of claim 20, further comprising:
determining that the error occurred with the operation based on a comparison of the one or more metrics and expected results associated with the operation.

22. The method of claim 19, further comprising:
storing, at non-transitory electronic storage media of the mobile device, one or more events, an individual event comprising information indicating that an error occurred with one or more of the test application and the mobile device.

23. The method of claim 22, further comprising:
determining that the error occurred with the operation based on a comparison of the one or more metrics and the stored one or more events.

24. The method of claim 19, further comprising:
transmitting, at one or more pre-determined intervals, the one or more metrics to a computing device remote from the mobile device and the one or more other mobile devices.

25. The method of claim 19, further comprising:
transmitting the error information to the computing device.

26. A non-transitory electronic storage media storing computer program instructions for performing field testing using a test application, the computer program instructions, when executed at a mobile device, programs the mobile device to:
- execute one or more operations of the test application;
- obtain one or more metrics related to the execution of the one or more operations;
- determine whether an error occurred with an operation, from among the one or more operations, based on the one or more metrics;
- cause error information relating to the error to be transmitted to one or more other mobile devices responsive to a determination that the error occurred with the operation, wherein the error information includes information used to replicate the error;
- receive, back from at least a first other mobile device among the one or more other mobile devices, replication information relating to an attempt by the first other mobile device to replicate the error; and
- determine whether the first other mobile device replicated the error based on the replication information.

27. The storage media of claim 26, wherein the non-transitory media further stores:
- one or more test scripts relating to the test application, an individual test script comprising the one or more operations to be performed in a set order.

28. The storage media of claim 27, wherein the computer program instructions, when executed, further program the mobile device to:
- determine that the error occurred with the operation based on a comparison of the one or more metrics and expected results associated with the operation.

29. The storage media of claim 26, wherein the non-transitory media further stores:
- one or more events, an individual event comprising information indicating that an error occurred with one or more of the test application and the mobile device.

30. The storage media of claim 29, wherein the computer program instructions, when executed, further program the mobile device to:
- determine that the error occurred with the operation based on a comparison of the one or more metrics and the stored one or more events.

31. The storage media of claim 26, wherein the computer program instructions when executed, further program the mobile device to:
- transmit, at one or more pre-determined intervals, the one or more metrics to a computing device remote from the mobile device and the one or more other mobile devices.

32. The storage media of claim 26, wherein the computer program instructions when executed, further program the mobile device to:
- transmit the error information to the computing device.

33. A computing device that facilitates field testing of mobile devices to which the computing device is communicably coupled, the computing device comprising:
- one or more physical processors programmed with computer program instructions, the computer program instructions, when executed by the one or more physical processors, program the computing device to:
- obtain, from a first mobile device, error information relating to an error that occurred in relation to execution of an operation at the first mobile device;
- obtain, from a second mobile device, replication information relating to an attempt by the second mobile device to replicate the error;
- determine whether the second mobile device replicated the error based on the replication information;
- determine whether the first mobile device and the second mobile device share in common an attribute responsive to a determination that the first other mobile device replicated the error;
- determine that the attribute is a possible cause of the error responsive to a determination that the first mobile device and the second mobile device share in common the attribute.

34. The computing device of claim 33, the computing device further programmed to:
- cause the error information to be transmitted to the second mobile device.

35. The computing device of claim 33, wherein the error information is transmitted from the first mobile device to the second mobile device.

* * * * *